United States Patent
Grawey

[11] 3,897,814
[45] Aug. 5, 1975

[54] TIRE TREAD BELT

[75] Inventor: Charles E. Grawey, Peoria, Ill.

[73] Assignee: Caterpillar Tractor Co., Peoria, Ill.

[22] Filed: Mar. 11, 1974

[21] Appl. No.: 449,941

[52] U.S. Cl............ 152/361 R; 152/175; 152/187; 152/354; 152/362 R
[51] Int. Cl.² B60C 9/18; B60C 11/02; B60C 15/00
[58] Field of Search... 152/361 R, 361 FP, 361 DM, 152/187, 175, 354, 362 R

[56] References Cited
UNITED STATES PATENTS

| | | | |
|---|---|---|---|
| 2,939,502 | 6/1960 | Hindin et al. | 152/361 R |
| 3,224,481 | 12/1965 | Lugli | 152/361 R |
| 3,503,432 | 3/1970 | Maiocchi | 152/361 DM |
| 3,550,666 | 12/1970 | Menell et al. | 152/361 R |
| 3,557,858 | 1/1971 | Lugli et al. | 152/361 R |
| 3,606,921 | 9/1971 | Grawey | 152/361 R |
| 3,612,136 | 9/1971 | Gough | 152/361 R |
| 3,703,202 | 11/1972 | Maiocchi | 152/361 R |

Primary Examiner—Drayton E. Hoffman
Attorney, Agent, or Firm—Phillips, Moore, Weissenberger Lempio & Strabala

[57] ABSTRACT

An improved tire tread belt which is designed to be utilized around the circular periphery of a pneumatic tire carcass employs an integral cylindrical elastomer belt having at least one internal cylindrical reinforcing ply composed of cylindrical loops of reinforcing wherein the physical distribution of the cylindrical loops has the greatest concentration in the center portion, thereby providing a tread belt with enhanced service life and lower cost.

12 Claims, 3 Drawing Figures

3,897,814

TIRE TREAD BELT

BACKGROUND OF THE INVENTION

Belted tires are winning acceptance by both industry and the public and usually are constructed with a belt structure on the crown of a radially reinforced beaded tire carcass. This belt structure varies considerably, depending on the manufacturer, but is usually formed integrally with the tire carcass. Alternatively, the tread belt can be formed separately and subsequently located on the crown of the carcass after the carcass has been completed as a separate unit. In this type of construction, the tread belt is a replaceable unit. illustrating this latter type of construction in U.S. Pat. No. 2,609,026 issued to Luchsinger-Caballero and U.S. Pat. No. 2,874,742 issued to Lugli. Also, the replaceable-type tread belt can be employed on a tube-type tire as illustrated in U.S. Pat. No. 3,606,921 issued to Grawey. More particularly, the instant invention is primarily designed for the tube-type tire construction illustrated in the above-referenced U.S. Pat. No. 3,606,921. These types of tube-tires have a very low aspect ratio and the belt design is specifically adapted to tires having exceptionally low aspect ratios and a substantially flat crown. However, this belt likewise could be utilized on a tire such as illustrated in the above-referenced U.S. Pat. No. 2,874,742 issued to Lugli. Since the carcasses disclosed and illustrated in the referenced patents will generally have a flat crown, they often will employ reinforcing which will be oriented radially in the tire carcass so that the belt will actually confine the crown of the carcass to the flat configuration when the carcass is pressurized.

In such types of tires, it is to be appreciated that the tread belt, in addition to forming a base for holding the wear surface (tread) of the tire, also must be able to contain considerable pressure due to the relatively large surface area of the flat crown. Further, in the most preferred embodiment of this invention, the belt must be substantially inextensible, since it is not desirable that the crown change configuration due to internal pressure changes within the carcass. Inextensible with reference to the reinforcing is used in the general context in which it is employed in the tire arts, where it is held to mean that the reinforcing has a 5 percent maximum working elongation under service conditions. Further, this particular invention is related to belt systems wherein the reinforcing in the cylindrical ply of the belt is oriented substantially parallel with the mid-circumferential plane of the belt, being generally applied by winding with a slight advance angle on the helical pattern laid down by such a winding operation.

Some difficulty with tread belts in the prior art configurations have been experienced at the edges of the belt where considerable flexure occurs. Thus it is an object of this invention to provide an improved tread belt having an enhanced service life with respect to those utilized in the prior art.

It is also an object of the instant invention to improve the economy of manufacturing tread belts without any loss of performance.

Both of these objects can be accomplished whether or not the tread belt is integral with the carcass or formed separately as a replaceable unit. However, the invention is primarily directed to the replaceable tread belt configuration.

SUMMARY OF THE INVENTION

The above objects and advantages, as well as others, can be accomplished with an improved tire tread belt comprising a cylindrical elastomer belt having a wear pattern on its outer cylindrical surface and at least one internal cylindrical reinforcing ply of circumferentially disposed reinforcing elements forming loops therein, said loops being distributed within the cylindrical reinforcing ply with lesser concentration of loops at the edges of said reinforcing ply than in the central portion thereof, whereby enhanced service life of the tread belt is achieved. Normally, the cylindrical reinforcing ply will be generally flat and fabric augmentation of the elastomer near the edges may be utilized to lessen the danger that the shear strength of the elastomer may be exceeded in the edge areas of the belt when it is subjedted to severe maneuvering loads at higher speeds.

DESCRIPTION OF THE PREFERRED EMBODIMENT

Figure 1:
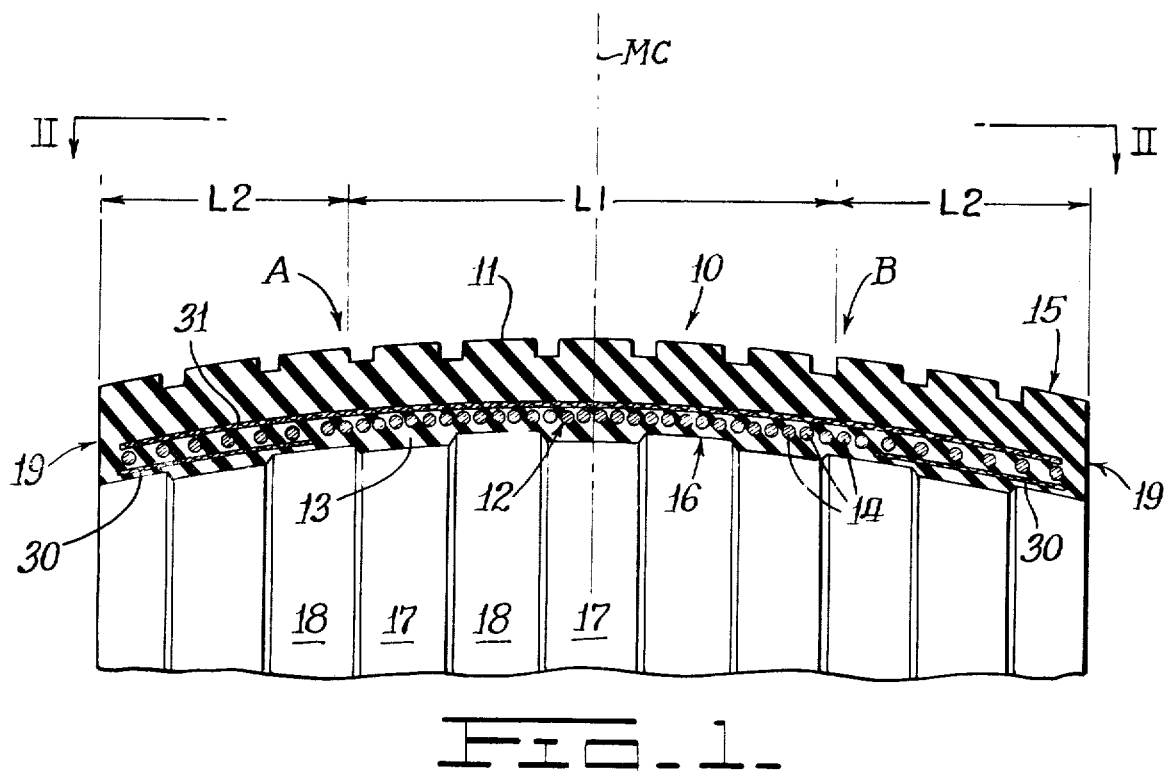
FIG. 1 is a cross section of the improved tire tread belt illustrating the internal reinforcing distribution within the cylindrical reinforcing ply and also a slightly curved crown configuration in the belt.
Figure 2:
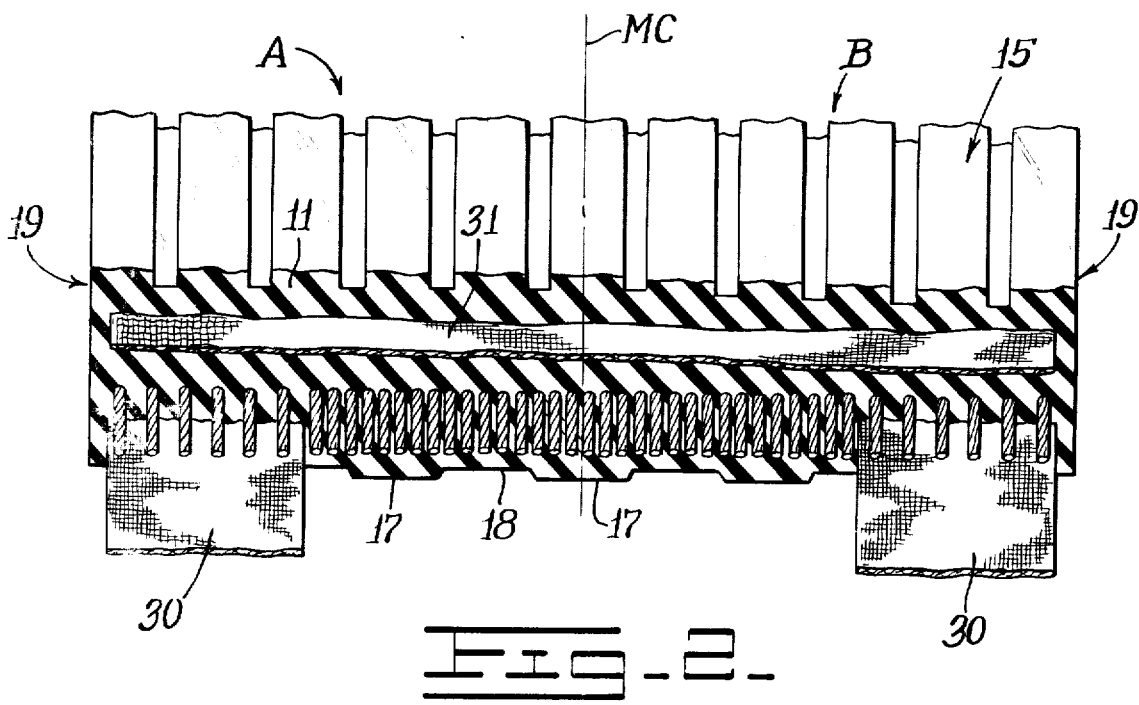
FIG. 2 is a plan view of a broken-away portion of the belt illustrated in FIG. 1 with additional parts of the belt broken away to show the internal construction detail thereof.

Referring to FIG. 1 showing a cross section of the improved tire tread belt 10, it should be understood that the belt shown is an integral unit unto itself and can be cured as such, if it is formed separately from the carcass. However, also it should be appreciated that the tire tread belt could be formed integrally with the carcass, being cured before or after it is combined with the carcass. In either case, for convenience of description, portions of the tire tread belt will be given separate identities for clarity, even though in the cured configuration, these portions are really parts of the integral belt.

In the context of the preceding paragraph, the tire tread belt 10 has a generally cylindrical appearance when it is mounted on the circular surface of the pneumatic tube-tire and will be generally described with reference to this working configuration. More precisely, it can be considered as formed with an outer elastomer layer 11, an internal cylindrical reinforcing ply 12, and an inner elastomer layer 13, with the cylindrical reinforcing ply sandwiched between the two elastomer layers. As the individual reinforcing elements 14 are essentially cylindrical loops arranged in a generally side-by-side relationship, the elastomer of the outer and inner layers actually will strike-through between these individual elements and bond to one another in the integral belt. Therefore, they do not truly exist as independent layers in the completed belt.

The tire tread belt 10 includes a cylindrical wear surface 15 that can include the appropriate tread configuration depending upon service configurations in which the tire tread belt is to be utilized. In fact, the outer elastomer layer 11 can be compounded for improved wear characteristics while the inner layer 13 can be compounded to achieve improved bonding capabilities with the reinforcing elements 14. In general, the conventional rubber compounds utilized in conventional tires can be employed as elastomers for the construction of the tread belt, whether it is integrally cured with a carcass or separately cured.

When the belt is formed as a separate replaceable unit, the inner elastomer layer 13 can have an internal cylindrical mating circuit 16 composed of lands 17 and grooves 18. Under these circimstances, the carcass would have the reverse mating configuration to accept the belt, and these grooves and lands will prevent the belt from sliding laterally off the carcass when a belt is subjected to lateral loads with respect to its axis of rotation. Alternatively, the inner layer 13 in the integral belt and carcass configuration would merely form an intermediate insulating layer of elastomer between the reinforcing elements of the carcass and the cylindrical reinforcing ply 12 of the improved belt configuration. Obviously, in such a situation, this inner layer would bond with elastomers in the carcass as well as those within the belt to form the complete tire.

According to the instant invention, the distribution of the reinforcing elements or loops 14 is varied to improve the wear and service characteristics of the belt. More precisely, the belt can be defined as having symmetrical halves on either side of the mid-circumferential plane MC, which is a plane that theoretically divides the cylindrical belt into two similar cylindrical halves A and B. In general, the concentration of the loops 14 in each half A and B is greatest adjacent to the mid-circumferential plane MC with the concentration of the loops being less in each edge 19.

To better define the invention, each reinforcing ply 12 within the improved tire tread belt 10 can be considered a cylinder with a thickness equal to the diameter of the reinforcing elements 14 and a width equal to the width of the belt. Thus, with respect to any width portion of this hypothetical cylindrical reinforcing ply, it is possible to express the ratio of the cross sectional area of the reinforcing elements 14 with respect to the cross sectional area of the rubber which separates (strikesthrough) between the individual reinforcing elements. For convenience of description, the width of the tire belt is divided into three portions designated as a central portion $L_1$ and two equal edge portions $L_2$. In the hypothetical cylinder, the ratio of the reinforcing elements 14 to the elastomer separating these elements can vary from 60:40 to 85:15 in the central portion $L_1$. Usually a distribution of approximately 70 percent reinforcing elements to 30 percent elastomer in the hypothetical cylinder is preferred in the central portion $L_1$.

In the side portions $L_2$, the distribution is approximately the reverse, with 30 percent reinforcing elements and 70 percent elastomer being preferred, even though these ratios can vary from 40:60 to 15:85.

As reinforcing ply 12 is usually wound on the cylindrical inner elastomer layer 13 during manufacture of the belt, the lead of the helical pattern formed as the cylindrical loops are applied is very small in the central portion $L_1$ and increases in the side portions $L_2$. In fact, the lead can be progressively increased from the mid-circumferential plane MC to each edge 19 to fall within the ratios indicated above.

Normally, the side portions $L_2$ will form only a small portion of the width of the belt that is immediately adjacent to the side walls of the carcass, with the central portion being adjusted in width according to the width of the belt. The concentration of the reinforcing loops in the central portion $L_1$ will always be greater than 110% of their concentration in the edge portions $L_2$.

Thus, even in larger size tires, the width of the side portions $L_2$ of the belt will be at least one-eighth and never more than one-third of the total width of the belt. Technically, the central section has the higher distribution of reinforcing elements in order to hold the rather substantial pressure urging the crown of the tire carcass outwardly. At the edges adjacent to the sidewalls, less pressure is contained by the belt, since the radial reinforcing elements in the sidewalls of the carcass assumes some portion of this load. As a result, the distribution of the reinforcing elements within the tire tread belt 10 can be decreased in this edge area. Further, since the side portions $L_2$ of the belt are the areas where relatively high flexing and stress occur, it is desirable that this portion of the belt, i.e., the side portions $L_2$, have the greatest strike-through of elastomer between the reinforcing elements or loops, thereby taking advantage of the greater tensile strength of bonding of elastomer-to-elastomer than the tensile strength of the bond of the elastomer-to-reinforcing elements 14. This increases the resistance to shear loadings in the side portions $L_2$ of the belt since it enhances the shear strength thereof in this area.

The reinforcing elements 14 can be composed of individual wires or cables which can be utilized to form the loops. When individual wires are utilized, relatively small diameter wire is employed, having diameters from 0.003 to 0.035 inches. Even when cable is utilized as reinforcing 14, the individual wires have a diameter from 0.003 to 0.020 inches. Actually, in the case of cables, it should be appreciated that some rubber would influx into the central portion of the cable, making the above ratios somewhat imprecise. However, for the purposes of understanding the invention, any rubber within the cable diameter can be discounted and the diameter of the reinforcing would be the outer diameter of the wire or cable, depending on which is utilized. Also, if multiple cylindrical plies 12 are employed in the tire tread belt 10, each cylindrical ply may be formed and oriented as described above or in other configurations.

Figure 3:
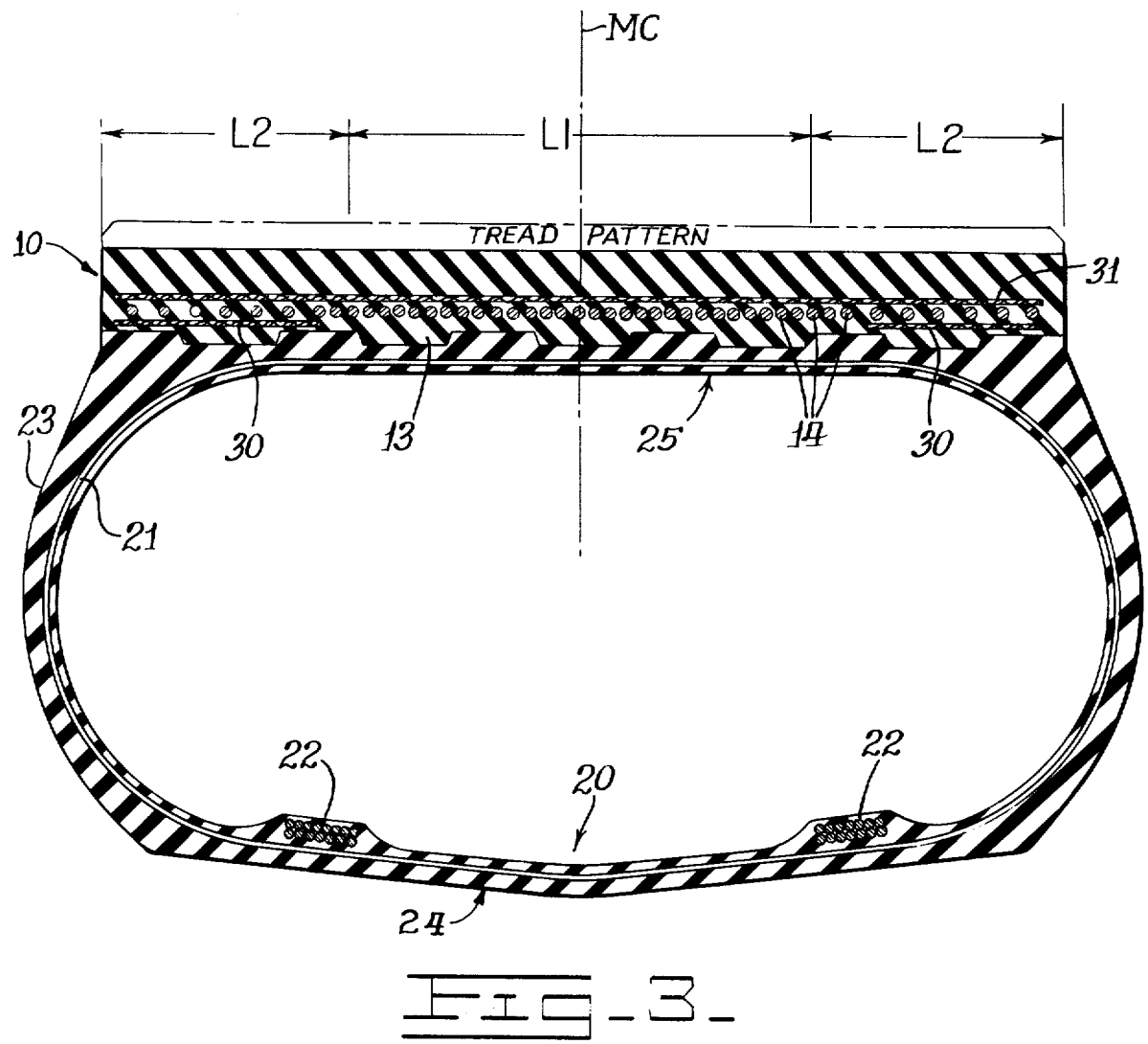
FIG. 3 is a cross section of a tire tread belt similar to that illustrated in FIG. 1 utilizing a substantially falt crown and also illustrating the belt located on the crown of a tube-tire shown in section to better illustrate its relationship with a pneumatic carcass.

A more preferred embodiment of the tire tread belt 10 is illustrated in FIG. 3, wherein the belt is associated with a tube-tire carcass 20 having inextensible radial reinforcing elements 21 encircling the carcass and inextensible roll restraining hoops 22 located at the base of each semi-circular sidewall 23 within the reinforcing elements. The sidewalls are connected with a rim wall 24. This tube-tire carcass has a substantially flat crown 25 and is actually built in the configuration shown in FIG. 3. Thus, the tire tread belt should be designed to hold the crown of the carcass in its substantially flat configuration when the latter is pressurized. Usually the belt will have a tread radius of 17 inches or larger. Further, the construction of the tube-tire carcass is better described in the aforementioned U.S. Pat. No. 3,606,921 issued to Grawey.

In the embodiment of FIG. 3, the central portion $L_1$ has a ratio of reinforcing to elastomer of approximately 75:25 and the side portions approximately 40:60. Further this belt, as well as those shown in other figures, can use fabric strips 30 (preferably an open mesh type fabric) under the reinforcing elements 14 being disposed in the inner elastomeric layer 13 to prevent lateral separation of the reinforcing elements 14 in the side portions $L_2$. In addition, in the crown area above the reinforcing elements 14, a wide fabric strip 31 can be employed for a similar purpose.

These fabric strips are designed to enhance the shear strength of the side portions $L_2$ when a vehicle employing the improved tire tread belt is cornering or maneuvering in a manner to develop substantial lateral loadings on the tire. These lateral loads tend to separate the reinforcing elements and in some cases, may exceed the shear strength of the elastomer. Thus, the fabric strips in the side portions $L_2$ of the tire tread belt can alleviate belt failure in these particular areas.

Having described my invention, I claim:

1. An improved tire tread belt comprising a cylindrical elastomer belt having an outer cylindrical wear surface including a tread and at least one internal symmetrical cylindrical reinforcing ply of circumferentially disposed reinforcing elements, said cylindrical reinforcing ply extending substantially the full width of said belt with elastomer disposed between and surrounding said reinforcing elements, said reinforcing elements being distributed in said cylindrical ply with decreasing concentration from the middle thereof to its edges so the concentration of said reinforcing elements is denser in the mid portion of the tire belt than at the edge portions.

2. The improved tire tread belt defined in claim 1 wherein the reinforcing elements are cylindrical loops and are substantially inextensible.

3. The improved tire tread belt defined in claim 1 wherein the tread belt is an integral part of a tire carcass.

4. The improved tire tread belt defined in claim 2 wherein the tread belt is a separate unit for the carcass for which it is designed and includes an inner elastomer surface, said inner elastomer surface having mounting means oriented to cooperate with mating mounting means in such carcass for which it is designed.

5. The improved tire tread belt defined in claim 4 wherein the concentration of the reinforcing loops in the central portion is greater than the concentration of said loops in the edge portions of said tire tread belt.

6. The improved tire tread belt defined in claim 5 wherein the loops are oriented generally parallel with the midcircumferential plane of the tire tread belt.

7. The improved tire tread belt defined in claim 5 wherein circular fabric strips are integrated with the edge portions of the tire tread belt to increase the shear strength of the belt in these portions.

8. The improved tire tread belt defined in claim 7 wherein the circular fabric strips are formed with an open mesh fabric, said mesh size being adequate to allow the elastomer to strike-through said mesh.

9. The improved tire tread belt defined in claim 8 wherein multiple circular fabric strips are used in the edge portions of the tire tread belt.

10. The improved tire tread belt defined in claim 5 wherein the belt has a tread radius of at least 17 inches.

11. The improved tire tread belt defined in claim 5 wherein the cylindrical reinforcing ply is substantially flat.

12. The improved tire tread belt defined in claim 5 wherein the ratio of reinforcing loops to elastomer between said loops in the cylindrical reinforcing of the central portion of the tire tread belt is at least 60:40 and the ratio of said reinforcing loops to elastomer between said loops in the cylindrical reinforcing ply in the edge portion is no greater than 40:60.

* * * * *